(12) United States Patent
Ogata et al.

(10) Patent No.: US 11,326,228 B2
(45) Date of Patent: May 10, 2022

(54) METHOD FOR SEPARATING RARE EARTH ELEMENT

(71) Applicants: NATIONAL INSTITUTE OF ADVANCED INDUSTRIAL SCIENCE AND TECHNOLOGY, Tokyo (JP); SANTOKU CORPORATION, Hyogo (JP)

(72) Inventors: Takeshi Ogata, Ibaraki (JP); Hirokazu Narita, Ibaraki (JP); Mikiya Tanaka, Ibaraki (JP); Tadatoshi Murota, Hyogo (JP)

(73) Assignees: NATIONAL INSTITUTE OF ADVANCED INDUSTRIAL SCIENCE AND TECHNOLOGY, Tokyo (JP); SANTOKU CORPORATION, Hyogo (JP)

(*) Notice: Subject to any disclaimer, the term of this patent is extended or adjusted under 35 U.S.C. 154(b) by 269 days.

(21) Appl. No.: 16/754,413

(22) PCT Filed: Oct. 22, 2018

(86) PCT No.: PCT/JP2018/039207
§ 371 (c)(1),
(2) Date: Apr. 8, 2020

(87) PCT Pub. No.: WO2019/078368
PCT Pub. Date: Apr. 25, 2019

(65) Prior Publication Data
US 2020/0308669 A1    Oct. 1, 2020

(30) Foreign Application Priority Data
Oct. 20, 2017    (JP) .............................. JP2017-203986

(51) Int. Cl.
| | | |
|---|---|---|
| *C22B 3/24* | (2006.01) |
| *C22B 59/00* | (2006.01) |
| *B01J 20/10* | (2006.01) |
| *B01J 20/02* | (2006.01) |
| *B01J 20/26* | (2006.01) |
| *B01D 15/02* | (2006.01) |
| *B01J 20/32* | (2006.01) |
| *C22B 3/08* | (2006.01) |
| *C22B 3/10* | (2006.01) |

(52) U.S. Cl.
CPC ............... *C22B 3/24* (2013.01); *B01D 15/02* (2013.01); *B01J 20/0203* (2013.01); *B01J 20/103* (2013.01); *B01J 20/261* (2013.01); *B01J 20/262* (2013.01); *B01J 20/321* (2013.01); *B01J 20/3212* (2013.01); *C22B 59/00* (2013.01); *B01J 2220/42* (2013.01); *B01J 2220/445* (2013.01); *C22B 3/08* (2013.01); *C22B 3/10* (2013.01)

(58) Field of Classification Search
CPC . C22B 3/24; C22B 59/00; B01D 15/02; B01J 20/103; B01J 20/0203; B01J 20/261; B01J 20/262; B01J 20/321; B01J 20/3212
See application file for complete search history.

(56) References Cited

U.S. PATENT DOCUMENTS

2016/0010178 A1*  1/2016  Ogata ................... B01J 20/3475
                                                             524/612

FOREIGN PATENT DOCUMENTS

| JP | 2009-160495 | 7/2009 |
|---|---|---|
| JP | 2009-249674 | 10/2009 |
| JP | 2011-231366 | 11/2011 |
| JP | 2012-184503 | 9/2012 |
| JP | 2013-1964 | 1/2013 |
| WO | 2014/157225 | 10/2014 |

OTHER PUBLICATIONS

Suneesh et al., J of Colloid and Interface Science, (2015), v.438, p. 55-60.*
International Search Report (ISR) dated Dec. 25, 2018 in International (PCT) Application No. PCT/JP2018/039207.
H. Naganawa et al., "A New "Green" Extractant of the Diglycol Amie Acid Type for Lanthanides", Solvent Extraction Research and Development, vol. 14, pp. 151-159, 2007, cited in the specification.
Y. Baba et al., "Selective Recovery of Dysprosium and Neodymium Ions by a Supported Liquid Membrane Based on Ionic Liquids", Solvent Extraction Research and Development, vol. 18, pp. 193-198, 2011, cited in the specification.
Matsunaga, Hideyuki, "Recognition, separation and concentration of metal ions with chelating resins or chelating reagent impregnated resins (Review)," Bunseki Kagaku, 2000, vol. 50, No. 2, pp. 89-106, cited in the specification.
Translation of the International Preliminary Report on Patentability dated Apr. 30, 2020 in International (PCT) Application No. PCT/JP2018/039207.
Hideyuki Matsunaga, "Recognition and Separation and Concentration of Metal Ions Using Chelating Resins and Resins Impregnated with Chelating Reagents", Analytical Chemistiy Review (Bunseki Kagaku), vol. 50, No. 2, pp. 89-106, 2000, cited in the specification.

* cited by examiner

*Primary Examiner* — Yong L Chu
(74) *Attorney, Agent, or Firm* — Wenderoth, Lind & Ponack, L.L.P.

(57) ABSTRACT

Provided is a method for easily and inexpensively separating a rare earth element contained in an aqueous solution.

10 Claims, 3 Drawing Sheets

METHOD FOR SEPARATING RARE EARTH ELEMENT

TECHNICAL FIELD

The present invention relates to a method for separating and recovering a rare earth element present in a solution using an adsorbent.

BACKGROUND ART

Rare earth elements are used in a wide range of applications such as permanent magnets, laser materials, catalysts, and phosphors, and are indispensable for cutting-edge industries. The production areas of these elements, however, are unevenly distributed, and it is pointed out that the supply structure is vulnerable. In order to secure stable rare earth element resources in the future, recycling (recovery) will be important in addition to searching for new deposits, developing alternative materials, reducing usage, and strategic storage.

As a method for recovering a rare earth element dissolved in an aqueous solution, methods such as a solvent extraction method using phosphate ester-based extractant (Patent Document 1) and a precipitation method using alkali or oxalic acid (Patent Document 2) are known.

When the concentration of an element to be separated is low, an adsorption method is effective as a separation technique. Examples of the method for adsorbing and recovering a rare earth element include a method utilizing a polymer (Patent Document 3) and a method utilizing a biological substance (Patent Document 4). Commercially available adsorbents such as strongly acidic cation exchange resins or iminodiacetic acid-based chelate resins also have the ability to adsorb rare earth elements.

Until now, because the price of rare earth elements was low, solutions containing high concentrations of rare earth elements, which are relatively easy to recover, were targeted for processing. From now on, it is desired that such rare earth elements be recovered also from a dilute aqueous solution of rare earth elements that has been discarded so far. In other words, there is a need for a method for selectively separating dilute rare earth element ions from an aqueous solution containing metal ions of base metals such as iron, copper, nickel, or zinc at a high concentration in a recovery step of rare earth elements from low-grade natural minerals and waste.

On the other hand, diglycolamic acid is known as an extractant for solvent extraction for selectively separating rare earth element ions and base metal ions (Non Patent Documents 1 and 2). It is well known, however, that when an extractant for solvent extraction is immobilized on a substrate, an expected selective separation effect is not obtained (Patent Document 5 (paragraph (0009), Non Patent Document 3 (p 90, 2.2)).

An extractant used in a liquid phase system can freely move in a solution and has a high degree of freedom in the molecule. Therefore, the diffusion rate is high, and the selectivity to a target substance is high. On the other hand, when a functional group is immobilized, the degree of freedom is lost, and the selectivity, the amount of adsorption, and the speed may be greatly reduced. In particular, in the case of a multidentate system which can be expected to have high selectivity, the tendency is conspicuous, which is disadvantageous.

An example of techniques for immobilizing an extractant to a substrate that improve such a disadvantage is an impregnation method. This is a method in which an organic solvent containing an extractant is impregnated into a hydrophobic substrate, and the original selectivity of the extractant is maintained because the degree of freedom of the extractant is not reduced.

However, since an extractant is retained by physical interaction such as distributing to a solvent, the extractant leaks out, making it difficult to use repeatedly. The adsorption speed is low because the interface area is small.

As described above, various methods for separating rare earth elements have been studied. However, when the content of rare earth elements is low and the impurity concentration is high, separation and recovery are difficult with these methods.

Therefore, Patent Document 6 proposes an adsorbent for rare earth elements and a method for recovering rare earth elements that can adsorb and recover a rare earth element contained in an aqueous solution simply and inexpensively and a rare earth element coexisting with a base metal in an aqueous solution selectively.

CITATION LIST

Patent Documents

Patent Document 1: JP 2012-184503 A
Patent Document 2: JP 2009-249674 A
Patent Document 3: JP 2011-231366 A
Patent Document 4: JP 2013-001964 A
Patent Document 5: JP 2009-160495 A
Patent Document 6: WO2014/157225

Non Patent Documents

Non Patent Document 1: H. Naganawa et al., "A New "Green" Extractant of the Diglycol Amic Acid Type for Lanthanides" *Solvent Extraction Research and Development*, Japan, Vol. 14 151-159 (2007)
Non Patent Document 2: Y. Baba et al., "Selective Recovery of Dysprosium and Neodymium Ions by a Supported Liquid Membrane Based on Ionic Liauids" *Solvent Extraction Research and Development*, Japan, Vol. 18, 193-198 (2011)
Non Patent Document 3: Hideyuki Matsunaga, "Recognition and Separation and Concentration of Metal Ions Using Chelating Resins and Resins Impregnated with Chelating Reagents", *Analytical Chemistry Review (Bunseki Kagaku)*, Vol. 50, No 2, pp. 89-106 (2000)

SUMMARY OF INVENTION

Technical Problem

The present inventors conducted a rare earth element recovery test using the adsorbent and recovery method disclosed in Patent Document 6 to find that as the adsorbent was used for a long period of time, the amount of adsorbed rare earth element ions decreased, and the amount of rare earth element recovered decreased.

Accordingly, a main object of the present invention is to provide a method for easily and inexpensively separating a rare earth element contained in an aqueous solution. A further object of the present invention is to provide a method for recovering a rare earth element which can selectively adsorb and separate a rare earth element coexisting with a base metal in an aqueous solution over a long period of time.

Solution to Problem

In order to achieve the above-described object, the present inventors intensively studied to find that tetravalent ions of elements such as cerium, zirconium, and thorium tend to strongly adsorb to an adsorbent, and under conditions for desorbing ordinary rare earth element ions, tetravalent ions do not desorb and concentrate in the adsorbent, inhibiting adsorption of rare earth element ions. The present inventors have further conducted intensive studies to find that the amount of dysprosium ions, which are rare earth element ions, adsorbed on a specific adsorbent in a specific acidic aqueous solution shows an acid concentration dependence, whereas the amount of zirconium ions, which are tetravalent ions, adsorbed on this specific acidic aqueous solution shows no acid concentration dependence on a specific adsorbent. Furthermore, it has been found that the adsorption amount of dysprosium ions, which are rare earth element ions, shows an acid concentration dependence on a specific adsorbent in another specific acidic aqueous solution, and also been found that the amount of adsorbed zirconium ions, which are tetravalent ions, shows an acid concentration dependence for a specific adsorbent in the other specific acidic aqueous solution.

Consequently, the present inventors have arrived at that utilization of the acid concentration dependence of an adsorbent in an acidic aqueous solution of rare earth element ions and tetravalent ions to selectively desorb and recover a rare earth element from the adsorbent and removal of the tetravalent ions concentrated on the adsorbent by selectively desorbing the tetravalent ions from the adsorbent improve the decrease in the amount of rare earth elements adsorbed and selectively adsorb and recover rare earth elements coexisting with a base metal in the aqueous solution over a long period of time, and completed the present invention.

The present invention includes the following embodiments.

<1> A method for separating rare earth elements, including
an adsorption step of bringing a solution containing rare earth element ions and tetravalent ions of a metal element other than the rare earth element ions into contact with an adsorbent to adsorb the rare earth element ions and the tetravalent ions to the adsorbent;
a rare earth element ion desorption step in which the adsorbent after the adsorption step is brought into contact with a first acidic aqueous solution to desorb the rare earth element ions from the adsorbent; and
a tetravalent ion desorption step of contacting the adsorbent after the rare earth element ion desorption step with a second acidic aqueous solution to desorb the tetravalent ions from the adsorbent, wherein
the adsorbent is composed of a substrate and diglycolamic acid introduced into the substrate,
the first acidic aqueous solution is from 0.1 mol/L to 4 mol/L hydrochloric acid or nitric acid, and
the second acidic aqueous solution is from 0.5 moL to 10 mol/L sulfuric acid.
<2> The method for separating a rare earth element according to <1>, further including a rare earth element recovery step of recovering a rare earth element from a solution obtained in the rare earth element ion desorption step.
<3> The method for separating a rare earth element according to <1> or <2>,
including at least two rare earth ion desorption steps, wherein
a tetravalent ion desorption step is performed after at least one rare earth element ion desorption step; and
at least one rare earth element ion desorption step is performed after the tetravalent ion desorption step.
<4> The method for separating a rare earth element according to any one of <1> to <3>, wherein the rare earth element ions are at least one selected from the group consisting of scandium ions, yttrium ions, lanthanum ions, cerium ions, praseodymium ions, neodymium ions, samarium ions, europium ions, gadolinium ions, terbium ions, dysprosium ions, holmium ions, erbium ions, thulium ions, ytterbium ions, and lutetium ions.
<5> The method for separating a rare earth element according to any one of <1> to <4>, wherein the tetravalent ions are at least one selected from the group consisting of zirconium ions, thorium ions, and cerium ions.
<6> The method for separating a rare earth element according to any one of <1> to <5>, wherein the adsorbent is obtained by introducing the diglycolamic acid into the substrate by an amide bond between a primary amine and/or secondary amine and diglycolic acid or diglycolic anhydride in a carrier including the primary amine and/or secondary amine on the substrate.
<7> The method for separating a rare earth element according to <6>, wherein the carrier is one selected from the group consisting of polyallylamine, polyethyleneimine, and chitosan.
<8> The method for separating a rare earth element according to any one of <1> to <6>, wherein the substrate is polystyrene, polyethylene, or polypropylene.
<9> The method for separating a rare earth element according to any one of <1> to <6>, wherein the substrate is silica gel.
<10> The method for separating a rare earth element according to <9>, wherein the substrate is silica gel, and the primary amine and/or secondary amine is an alkylamine.

Advantageous Effects of Invention

According to the present invention, a simple and inexpensive method for separating a rare earth element contained in a solution can be provided. Further, a rare earth element recovery method capable of selectively adsorbing and recovering rare earth element ions coexisting with a base metal in a solution over a long period of time can be provided.

Thorium ions, which are tetravalent ions, are radioactive substances, and it is not preferable to concentrate the ions in an adsorbent. According to the present invention, thorium ions can be prevented from being highly concentrated in an adsorbent.

DESCRIPTION OF EMBODIMENTS

Figure 1:
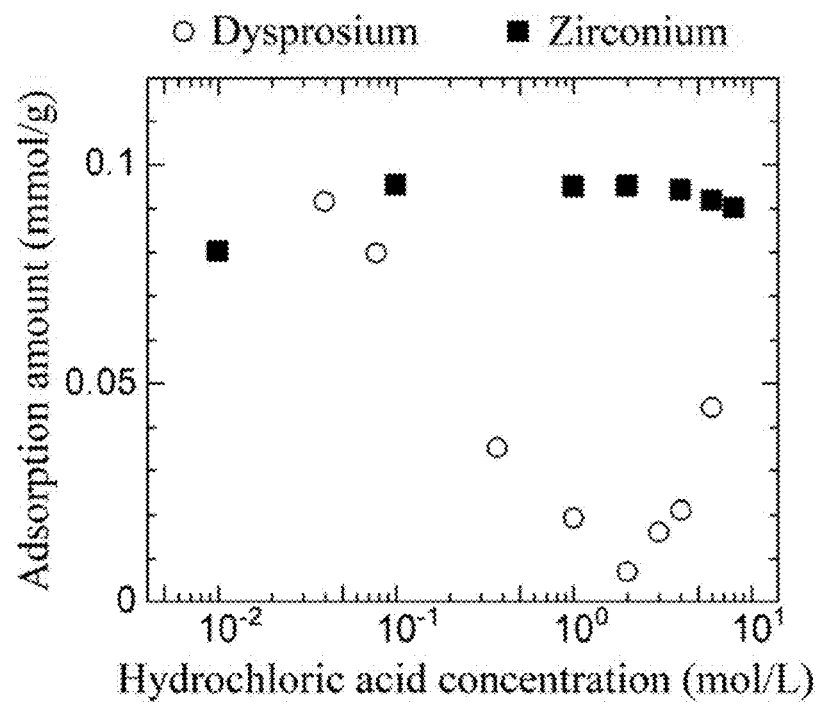
FIG. 1 is a diagram showing the dependence of dysprosium and zirconium adsorption by an EDASiDGA adsorbent on the concentration of hydrochloric acid.

The present invention will be described with reference to specific examples, but is not limited to the following contents without departing from the gist thereof, and can be implemented with appropriate modifications.

<Method for Separating Rare Earth Element>

The method for separating a rare earth element which is one embodiment of the present invention (hereinafter, may be abbreviated as "the separation method of the present invention") is a method for separating a rare earth element, including an adsorption step of bringing a solution containing rare earth element ions and tetravalent ions (hereinafter, may be abbreviated as "tetravalent ions") of a metal element other than the rare earth element ions into contact with an adsorbent to adsorb the rare earth element ions and the tetravalent ions to the adsorbent, a rare earth element ion desorption step in which the adsorbent after the adsorption step is brought into contact with a first acidic aqueous solution to desorb the rare earth element ions from the adsorbent; and a tetravalent ion desorption step of contacting the adsorbent after the rare earth element ion desorption step with a second acidic aqueous solution to desorb the tetravalent ions from the adsorbent, wherein the adsorbent is composed of a substrate and diglycolamic acid introduced into the substrate, the first acidic aqueous solution is from 0.1 mol/L to 4 mol/L hydrochloric acid or nitric acid, and the second acidic aqueous solution is from 0.5 mol/L to 10 mol/L sulfuric acid. Hereinafter, each of the above-described steps will be described.

1. Adsorption Step of Bringing Solution Containing Rare Earth Element Ions and Tetravalent Ions of Metal Element Other than Rare Earth Element Ions into Contact with Adsorbent to Adsorb Rare Earth Element Ions and Tetravalent Ions to Adsorbent In an adsorption step, a solution containing rare earth element ions and tetravalent ions of a metal element other than the rare earth element ions is brought into contact with an adsorbent to adsorb the rare earth element ions and the tetravalent ions to the adsorbent.

Hereinafter, a solution containing rare earth element ions and tetravalent ions, which is a target of the method for separating rare earth elements according to one embodiment of the present invention, will be described.

In the method for separating rare earth element according to one embodiment of the present invention, rare earth element ions contained in a solution containing rare earth element ions and tetravalent ions are preferably ions selected from the group consisting of scandium ions, yttrium ions, and lanthanoid ions with atomic numbers from 57 to 71 (excluding tetravalent ions), and more preferably ions selected from the group consisting of lanthanoid ions with atomic numbers from 59 to 71. These ions are trivalent. The lanthanoids with atomic numbers from 57 to 71 are lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

The rare earth element to be separated is not limited to one kind of element, and a plurality of rare earth elements may be separated at the same time.

Examples of the tetravalent ions include tetravalent ions of elements such as zirconium, thorium, cerium, and titanium, and zirconium ions, thorium ions, and cerium ions are preferable. Cerium is a rare earth element, and its ion is the only tetravalent stable ion among lanthanoid ions and can be separated as tetravalent ions. When a solution contains a plurality of tetravalent ions, a plurality of tetravalent ion elements are separated. A solution in which such a rare earth element ion and a tetravalent ion are dissolved in an aqueous solution or a hydrophilic organic solvent such as a lower alcohol is defined as a target solution.

A solution containing rare earth element ions and tetravalent ions may contain metal ions other than rare earth element ions and tetravalent ions. Examples of metal ions other than rare earth element ions and other than tetravalent ions include iron ions, copper ions, zinc ions, nickel ions, manganese ions, aluminum ions, alkali metal ions, and alkaline earth metal ions, which are base metal ions.

Although the concentration of rare earth element ions is not particularly limited, when the rare earth element ions are recovered from a low-concentration solution, the concentration is usually from 1 µmol/L to 0.1 mol/L, and preferably from 5 µmol/L to 10 mmol/L, and more preferably from 10 µmol/L to 5 mmol/L. The concentration of the tetravalent ions is not particularly limited, and is usually 10 mmol/L or less, preferably 5 mmol/L or less, and more preferably 1 mmol/L or less. The lower limit of the tetravalent ion concentration is usually 0.1 µmol/L. The concentration of rare earth element ions and metal ions other than tetravalent ions is usually 10 mol/L or less, preferably 5 mol/L or less, and more preferably 1 mol/L or less.

Examples of such target solutions include leachates such as apatite and marine sediments and process liquids and waste liquids from factories, mines, or the like.

The temperature at which this step is performed is usually from 5° C. to 80° C., and preferably from 10° C. to 70° C.

The adsorbent used in the present invention (hereinafter, sometimes abbreviated as "adsorbent") includes a substrate and diglycolamic acid introduced into the substrate. In other words, the adsorbent is composed of at least a substrate and diglycolamic acid introduced into the substrate. As the adsorbent, an adsorbent disclosed in WO 2014/157225 is preferably used.

Specifically, for example, diglycolic anhydride is added to dichloromethane, aminosilica gel is further added thereto, and the mixture is allowed to react at room temperature for several days. The obtained reaction product is separated by filtration, sufficiently washed with dichloromethane, ethanol, and water, and dried under reduced pressure to obtain an adsorbent.

Amino silica gel can be produced by reacting silica gel particles with a silane coupling agent including an amino group. Examples of commercially available products include 3-Aminopropyl Silica Gel (manufactured by Tokyo Chemical Industry Co., Ltd.), 3-(Ethylenediamino)propylic Silica Gel (Tokyo Chemical Industry Co., Ltd.), Scavenger NH SILICA (FUJI SILYSIA CHEMICAL LTD.), Scavenger DIAMINE SILICA (FUJI SILYSIA CHEMICAL LTD.), 3-(Ethylenediamino)propyl-functionalized silica gel (Aldrich), and 3-(Diethylentriamino)propyl-functionalized silica gel (manufactured by Aldrich Company).

In one embodiment of the present invention, an adsorbent obtained by introducing the diglycolamic acid into the substrate by an amide bond between a primary amine and/or secondary amine and diglycolic acid or diglycolic anhydride in a carrier including the primary amine and/or secondary amine on the substrate is preferred.

The carrier is provided with a primary amine and/or a secondary amine on a substrate, and an embodiment in which the carrier is one selected from the group consisting of polyallylamine, polyethyleneimine, and chitosan is preferred.

An embodiment in which the substrate is polystyrene, polyethylene, or polypropylene is also preferred.

An embodiment in which the substrate is silica gel is also preferred. An embodiment in which the substrate is silica gel, and the primary amine and/or secondary amine is an alkylamine is also preferred.

The method for bringing a solution containing rare earth element ions and tetravalent ions into contact with an adsorbent is not particularly limited as long as the solution containing rare earth element ions and tetravalent ions comes into contact with the adsorbent, and examples thereof include: a method of passing a solution containing rare earth element ions and tetravalent ions through a column with an adsorbent; and a method of charging the adsorbent into a solution containing rare earth element ions and tetravalent ions.

The temperature at which this step is performed is usually from 5° C. to 80° C., and preferably from 10° C. to 70° C.

2. Rare Earth Element Ion Desorption Step in which Adsorbent after Rare Earth Element Ion Adsorption Step is Brought into Contact with First Acidic Aqueous Solution to Desorb Rare Earth Element Ions from Adsorbent In a rare earth element ion desorption step, an adsorbent after an adsorption step is brought into contact with a first acidic aqueous solution to desorb rare earth element ions adsorbed on the adsorbent from the adsorbent.

The first acidic aqueous solution used in this step is from 0.1 mol/L to 4 mol/L hydrochloric acid or nitric acid. From the viewpoint of improving the separation accuracy, the acid concentration of the first acidic aqueous solution is preferably from 1 mol/L to 4 mol/L. The present inventors have found that the amount of dysprosium, a rare earth element, adsorbed on a specific adsorbent depends on the concentration of hydrochloric acid and the concentration of nitric acid.

As shown in FIG. 1, while dysprosium ions, rare earth element ions, exhibited a high adsorption amount to a specific adsorbent in hydrochloric acid in a low acid concentration range, the ions were hardly adsorbed in hydrochloric acid in a concentration range of from 0.1 mol/L to 4 mol/L. Zirconium, which is a tetravalent ion, did not show any dependence on the concentration of hydrochloric acid with respect to a specific adsorbent, and showed a high adsorption amount in both the low acid concentration range and the concentration range of from 0.1 mol/L to 4 mol/L.

Figure 2:
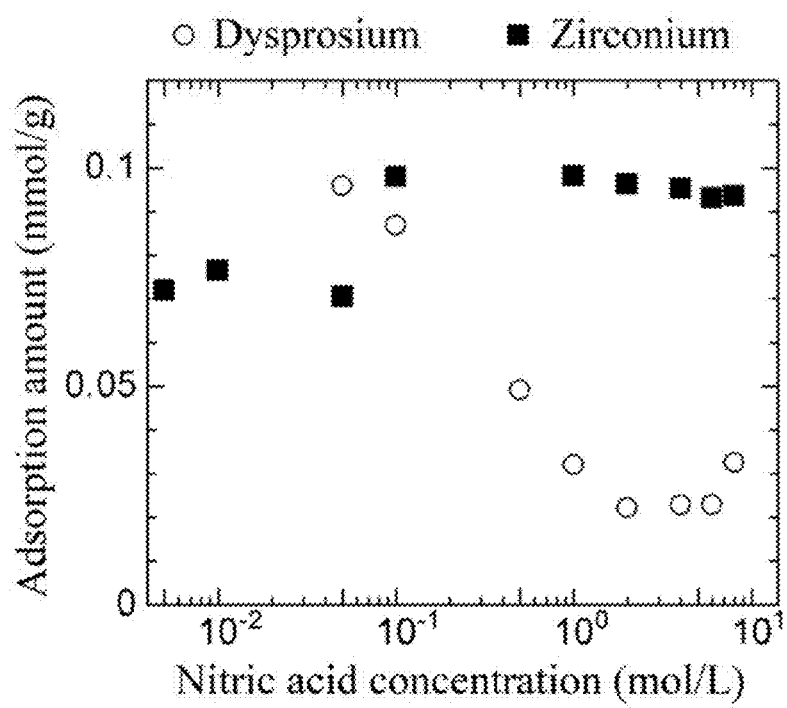
FIG. 2 is a diagram showing the dependence of dysprosium and zirconium adsorption by an EDASiDGA adsorbent on the concentration of nitric acid.

As shown in FIG. 2, while dysprosium ions, rare earth element ions, exhibited a high adsorption amount to a specific adsorbent in nitric acid in a low acid concentration range, the ions were hardly adsorbed in nitric acid in a concentration range of from 0.1 mol/L to 4 mol/L. Zirconium, which is a tetravalent ion, did not show any dependence on the concentration of nitric acid with respect to a specific adsorbent, and showed a high adsorption amount in both the low acid concentration range and the concentration range of from 0.1 mol/L to 4 mol/L.

In other words, by bringing the adsorbent after the adsorption step into contact with hydrochloric acid or nitric acid in a specific range of concentration, the rare earth element ions adsorbed by the adsorbent can be desorbed from the adsorbent. On the other hand, the tetravalent ions adsorbed on the adsorbent remain adsorbed on the adsorbent.

The temperature at which this step is performed is usually from 5° C. to 80° C., and preferably from 10° C. to 70° C., more preferably from 15° C. to 60° C., and particularly preferably room temperature (25° C.±3° C.).

The method of bringing an adsorbent on which rare earth element ions and tetravalent ions are adsorbed in contact with a first acidic aqueous solution in this step is not particularly limited as long as the first acidic aqueous solution is in contact with the adsorbent, and examples thereof include: a method of passing a first acidic aqueous solution through a column including an adsorbent on which rare earth element ions and tetravalent ions are adsorbed; and a method of charging an adsorbent on which rare earth element ions and tetravalent ions are adsorbed to a first acidic aqueous solution.

In Examples described below, while dysprosium ions are used as rare earth element ions, the adsorbent of the present invention also has the same adsorptivity as dysprosium to other rare earth ions, and therefore, the same can be said for other rare earth element ions.

3. Tetravalent Ion Desorption Step of Desorbing Tetravalent Ions from Adsorbent by Bringing Adsorbent after Rare Earth Ion Desorption Step into Contact with Second Acidic Aqueous Solution In a tetravalent ion desorption step, an adsorbent after a rare earth element ion desorption step is brought into contact with a second acidic aqueous solution to desorb tetravalent ions from the adsorbent.

The second acidic aqueous solution used in this step is from 0.5 mol/L to 10 mol/L sulfuric acid. The second acidic aqueous solution is preferably at least 1 mol/L from the viewpoint of improving the separation accuracy of tetravalent ions, and is preferably at 8 mol/L or less, more preferably 6 mol/L or less, from the viewpoint of handleability.

The present inventors have found that, in sulfuric acid having a concentration in the above-described range, the adsorption amount of dysprosium ions, rare earth element ions, for a specific adsorbent shows acid concentration dependence as in hydrochloric acid or nitric acid. In other words, dysprosium ions show a high amount of adsorption to a specific adsorbent in a low acid concentration range, and hardly adsorb in a concentration range of about from 0.1 mol/L to 4 mol/L. On the other hand, it was found that, unlike in hydrochloric acid or nitric acid, zirconium ions, which are tetravalent ions, show acid concentration dependence, and the adsorption amount tends to decrease at a sulfuric acid concentration of from 0.1 mol/L or more.

In other words, it is expected that, due to dependence of rare earth element ions on hydrochloric acid and nitric acid concentrations, and dependence of tetravalent ions on sulfuric acid concentration, in a process of desorption from a specific adsorbent, by using from 0.1 mol/L to 4 mol/L hydrochloric acid or nitric acid, tetravalent ions do not desorb from the adsorbent, desorption of rare earth element ions progresses and can be separated, and in addition, tetravalent ions can be separated from a specific adsorbent by using sulfuric acid having a concentration of from 0.5 mol/L to 10 mol/L.

The reason why zirconium ions (tetravalent ions) are desorbed from a specific adsorbent by contacting with sulfuric acid and not desorbed even by contacting with hydrochloric acid and nitric acid is presumed as follows.

Table 1 shows the complex formation constant $K_i$ of chloride ion, nitrate ion and sulfate ion for zirconium ion. The complex formation constant of sulfate ion for zirconium ion is much higher than chloride ion and nitrate ion. For this reason, it is estimated that, when the sulfate ion concentration of a solution in contact with an adsorbent increases, zirconium ions and sulfate ions adsorbed on the adsorbent form complex ions and are desorbed from the adsorbent.

Regarding the complex formation constants of thorium ion and cerium ion, which are other tetravalent ions, for sulfate ion, nitrate ion, and chloride ion, the complex formation constant for sulfate ion is much higher than those for chloride ion and nitrate ion as in the case of zirconium ion. For this reason, it is estimated that tetravalent ions other than zirconium, such as thorium ions and cerium ions, are also desorbed from a substrate by contacting with sulfuric acid as in the case of zirconium ion. Thorium is a radioactive substance, and it is not preferable to concentrate thorium in an adsorbent. According to the separation method of the present invention, thorium ion can be prevented from being highly concentrated in an adsorbent.

TABLE 1

| Element | Chloride ion | Nitrate ion | Sulfate ion |
|---|---|---|---|
| Zirconium [1] | $10^{0.30}$ | $10^{0.3}$ | $10^{3.74}$ |
| Thorium [2] | $10^{0.11}$ | $10^{0.45}$ | $10^{3.28}$ |
| Cerium | — | $10^{0.24}$ [3] | $10^{4.78}$ [4] |

Numerical values in Table 1 are values quoted from the following documents.
(1) R. E. Connick and W. H. McVey; "The Aqueous Chemistry of Zirconium," *J. Am. Chem. Soc.*, 71, 3182-3191 (1949).
(2) E. Zebroski, H. Alter, and F. Heumann, "Thorium Complexes with Chloride, Fluoride, Nitrate, Phosphate and Sulfate," *J. Am. Chem. Soc.*, 73, 5646-5650 (1951).
(3) V. I. Levin, G V. Korpusov, N. M. Man'ko, E. N. Patrusheva, N. P. Prokhorova, G F. Platnov, "Extraction of Tetravalent Cerium by Organic Solvents," Soviet Atomic Energy, 15, 828-835 (1964).
(4) K. Bachmann, K. H. Lieser, "Homogene Redoxreaktionen in Sulfationenhaltigen Losungen 0.2. System Ce-III-Ce-IV," *Ber. Buns. Phys. Chem.*, 67, 810-816 (1963).

The temperature at which this step is performed is usually from 5° C. to 80° C., preferably from 10° C. to 70° C., more preferably from 15° C. to 60° C., and particularly preferably room temperature (25° C.±3° C.).

In one embodiment of the rare earth element separation method of the present invention, it is also preferable to include at least two rare earth element ion desorption steps, where a tetravalent ion desorption step is performed after at least one rare earth element ion desorption step, and at least one rare earth element ion desorption step is performed after the tetravalent ion desorption step. In other words, by washing tetravalent ions concentrated in a rare earth element ion desorption step, decrease in the amount of rare earth ions adsorbed on an adsorbent can be suppressed, the separation accuracy of rare earth element can be improved, and the rare earth element can be recovered for a long period of time. By washing (desorbing) tetravalent ions concentrated on an adsorbent, the adsorbent can be used repeatedly. Furthermore, when a series of steps of the rare earth element ion desorption step and the tetravalent ion desorption step are performed a plurality of times, single or a plurality of rare earth element ions can be separated with high selectivity.

The method for separating a rare earth element according to one embodiment of the present invention can further include a rare earth element recovery step of recovering a rare earth element from a solution obtained in a rare earth element ion desorption step.

The method used in the recovery step is not particularly limited as long as a rare earth element can be recovered from a hydrochloric acid solution or a nitric acid solution containing the rare earth element ion, and examples thereof include a precipitation separation method using a carbonate or an oxalate.

According to the present invention, selective separation and recovery of rare earth elements over a long period of time can be realized by simple operations.

EXAMPLES

Hereinafter, the present invention will be described more specifically with reference to Examples, which can be appropriately modified without departing from the gist of the present invention. Accordingly, the scope of the present invention should not be construed as being limited by the specific Examples described below.

Adsorbent Production Example 1

Preparation of Adsorbent (Diglycolamic Acid-Introduced Silica Gel: EDASiDGA)

To 5 mL of dichloromethane, 0.4887 g of diglycolic anhydride was added, 1 g of commercially available amino silica gel (Scavenger DIAMINE SILICA, Fuji Silysia Chemical Ltd.) was further added thereto, and the mixture was allowed to react at 25° C. for 3 days. The obtained reaction product was separated by filtration, sufficiently washed with dichloromethane, ethanol, and water, and dried under reduced pressure to obtain an adsorbent.

Adsorption Test 1

Zirconium (IV) chloride (manufactured by Wako Pure Chemical industries, Ltd.) was dissolved in a hydrochloric acid aqueous solution to a concentration of 1 mmol/L, and adjusted to a predetermined hydrochloric acid concentration to prepare an aqueous solution for an adsorption test. Dysprosium (III) chloride hexahydrate (manufactured by Wako Pure Chemical Industries, Ltd.) was dissolved in a hydrochloric acid aqueous solution to a concentration of 1 mmol/ L, and adjusted to a predetermined hydrochloric acid concentration to prepare an aqueous solution for the adsorption test.

To 5 mL of each aqueous solution for the adsorption test, 50 mg of EDASiDGA was added, and the adsorption test was performed at 25° C. for 1 day with shaking. The solution was then collected, filtered through a 0.20 μm membrane filter, the concentration of a metal element in the aqueous solution was measured with a high frequency inductively coupled plasma (ICP) emission spectrometer, and the adsorption amount (mmol/g) of each metal element to an adsorbent was calculated from the mass balance.

FIG. 1 shows the results of the adsorption test. Dysprosium ions, which are rare earth element ions, depended on the hydrochloric acid concentration, showed a high adsorption amount in a low acid concentration range, and were hardly adsorbed at about 1-4 mol/L. On the other hand, zirconium ions, which are tetravalent ions, did not show dependence on the hydrochloric acid concentration, and all showed high adsorption amounts.

[Adsorption Test 2]

Zirconium (IV) chloride was dissolved in distilled water to a concentration of 1 mmol/L and adjusted to a predetermined nitric acid concentration to prepare an aqueous solution for the adsorption test. Dysprosium (III) nitrate hexahydrate (manufactured by Wako Pure Chemical Industries, Ltd.) was dissolved in a nitric acid aqueous solution to a concentration of 1 mmol/L, and adjusted to a predetermined nitric acid concentration to prepare an aqueous solution for the adsorption test.

To 5 mL of each aqueous solution for the adsorption test, 50 mg of EDASiDGA was added, and the adsorption test was performed at 25° C. for 1 day with shaking. The solution was then collected, filtered through a 0.20 μm membrane filter, the concentration of a metal element in the aqueous solution was measured with an ICP emission spectrometer, and the adsorption amount (mmol/g) of each metal element to an adsorbent was calculated from the mass balance.

FIG. 2 shows the results of the adsorption test. Rare earth element dysprosium ions, and zirconium ions, which are tetravalent ions, exhibited the same acid concentration dependence as a hydrochloric acid system. Dysprosium ions depended on the nitric acid concentration, showed a high adsorption amount in low acid concentration range, and were hardly adsorbed at about 1-4 mol/L, while zirconium ions did not show any dependence on the nitric acid concentration, and all showed high adsorption amounts.

[Adsorption Test 3]

Zirconium (IV) chloride was dissolved in distilled water to a concentration of 1 mmol/L, and adjusted to a predetermined sulfuric acid concentration to prepare an aqueous solution for an adsorption test. Dysprosium (III) sulfate octahydrate (manufactured by Strem Chemicals Inc.) was dissolved in a sulfuric acid aqueous solution to a concentration of 1 mmol/L, and adjusted to a predetermined sulfuric acid concentration to prepare an aqueous solution for the adsorption test.

To 5 mL of each aqueous solution for the adsorption test, 50 mg of EDASiDGA was added, and the adsorption test was performed at 25° C. for 1 day with shaking. The solution was then collected, filtered through a 0.20 μm membrane filter, the concentration of a metal element in the aqueous solution was measured with an ICP emission spectrometer, and the adsorption amount (mmol/g) of each metal element to an adsorbent was calculated from the mass balance.

Figure 3:
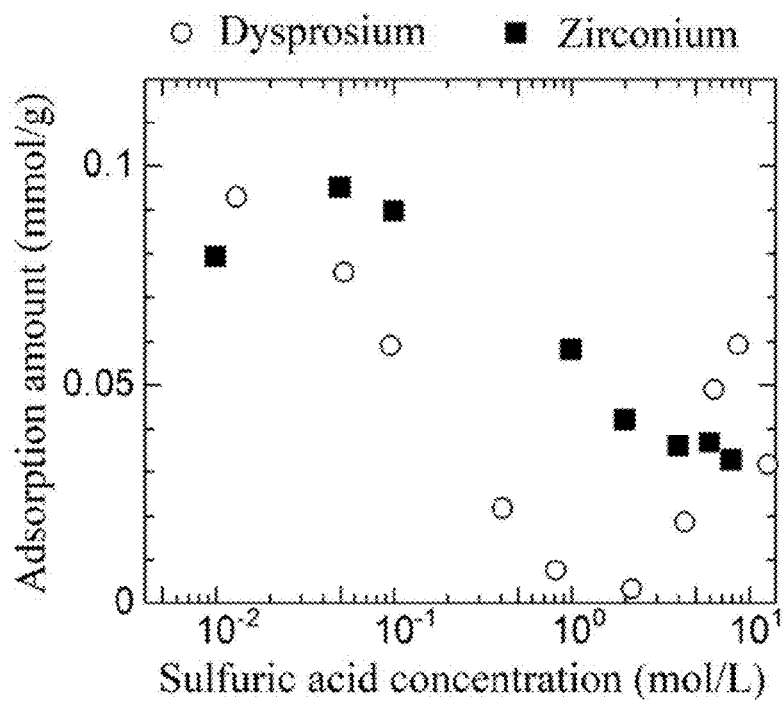
FIG. 3 is a diagram showing the dependence of dysprosium and zirconium adsorption by an EDASiDGA adsorbent on the concentration of sulfuric acid.

FIG. 3 shows the results of the adsorption test. Dysprosium ions, which are rare earth element ions, exhibited the same acid concentration dependence as the hydrochloric acid system and nitric acid system (highly adsorbed in a low acid concentration range, and hardly adsorbed at about 1-4 mol/L). On the other hand, zirconium ions, which are tetravalent ions, differed from the hydrochloric acid system and nitric acid system, and exhibited acid concentration dependence, and the adsorption amount tended to decrease at 0.1 mol/L or more.

[Adsorption Test 4]

In the case of a hydrochloric acid system, zirconium (IV) chloride was dissolved in a hydrochloric acid aqueous solution to a predetermined concentration, and the concentration of the hydrochloric acid was adjusted to 0.1 or 2 mol/L to prepare an aqueous solution for an adsorption test. In the case of a sulfuric acid system, zirconium (IV) chloride was dissolved in distilled water to a predetermined concentration, and the sulfuric acid concentration was adjusted to 2 mol/L to prepare an aqueous solution for the adsorption test.

To 5 mL of each aqueous solution for the adsorption test, 50 mg of EDASiDGA was added, and the adsorption test was performed at 25° C. for 1 day with shaking. The solution was then collected, filtered through a 0.20 μm membrane filter, the concentration of a metal element in the aqueous solution was measured with an ICP emission spectrometer, and the adsorption amount (mmol/g) of each metal element to an adsorbent was calculated from the mass balance.

Figure 4:
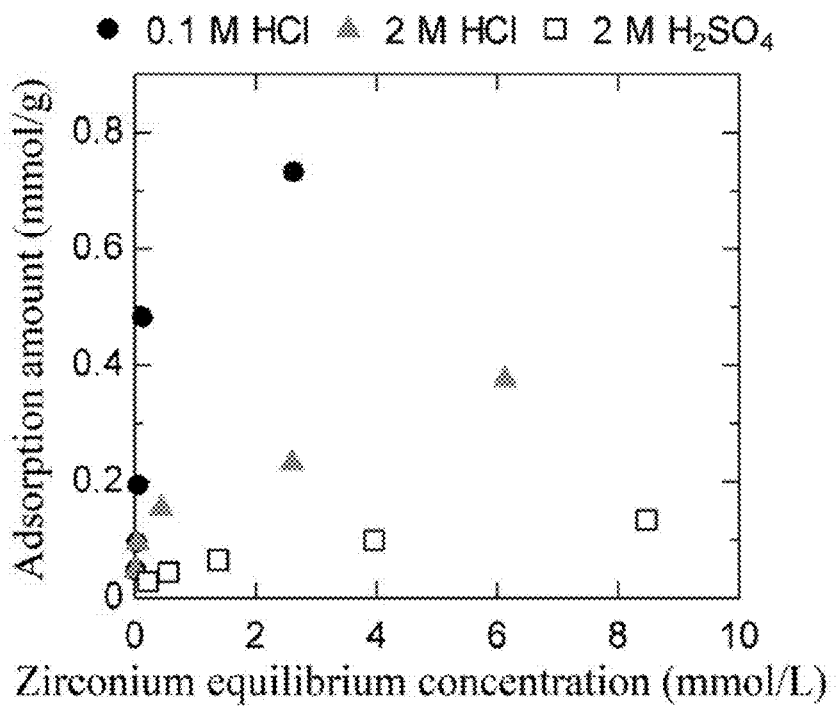
FIG. 4 is a diagram showing adsorption isotherms of zirconium by an EDASiDGA adsorbent at various acid concentrations.

FIG. 4 shows the results of the adsorption test. It became clear that the adsorption amount of zirconium at a hydrochloric acid concentration of 0.1 mol/L was high even at a low equilibrium concentration, and it was suggested that zirconium was strongly adsorbed to EDASiDGA. It became clear that even at a hydrochloric acid concentration of 2 mol/L, the amount adsorption was high at a low equilibrium concentration. From this result, it became clear that it is difficult to desorb adsorbed zirconium in a hydrochloric acid system. On the other hand, compared with a hydrochloric acid system, the adsorption amount at a low equilibrium concentration was lower in a sulfuric acid system, and it was suggested that adsorbed zirconium was able to be desorbed.

Example 1

Zirconium (IV) chloride, dysprosium (III) chloride hexahydrate, and iron (III) chloride hexahydrate were dissolved in a hydrochloric acid aqueous solution to a concentration of 1 mmol/L, and the concentration of hydrochloric acid was adjusted to 0.1 mol/L to prepare an aqueous solution for an adsorption test.

A glass column having an inner diameter of 5 mm and a length of 10 cm was packed with EDASiDGA (column volume: 1.96 cm$^3$), and a 0.1 mol/L hydrochloric acid aqueous solution was sufficiently passed through to condition the column. The aqueous solution for the adsorption test was passed through the column packed with EDASiDGA at a constant flow rate (0.654 mL/min, space velocity: 20 h$^{-1}$), and an effluent was collected. A washing liquid (0.01 mol/L hydrochloric acid aqueous solution) and a desorbing liquid (2 mol/L hydrochloric acid aqueous solution or 2 mol/L sulfuric acid aqueous solution) were then sequentially flown, and an effluent was collected. For each collected fraction, the concentration C of each element in an aqueous solution was measured with an ICP emission spectrometer.

Figure 5:
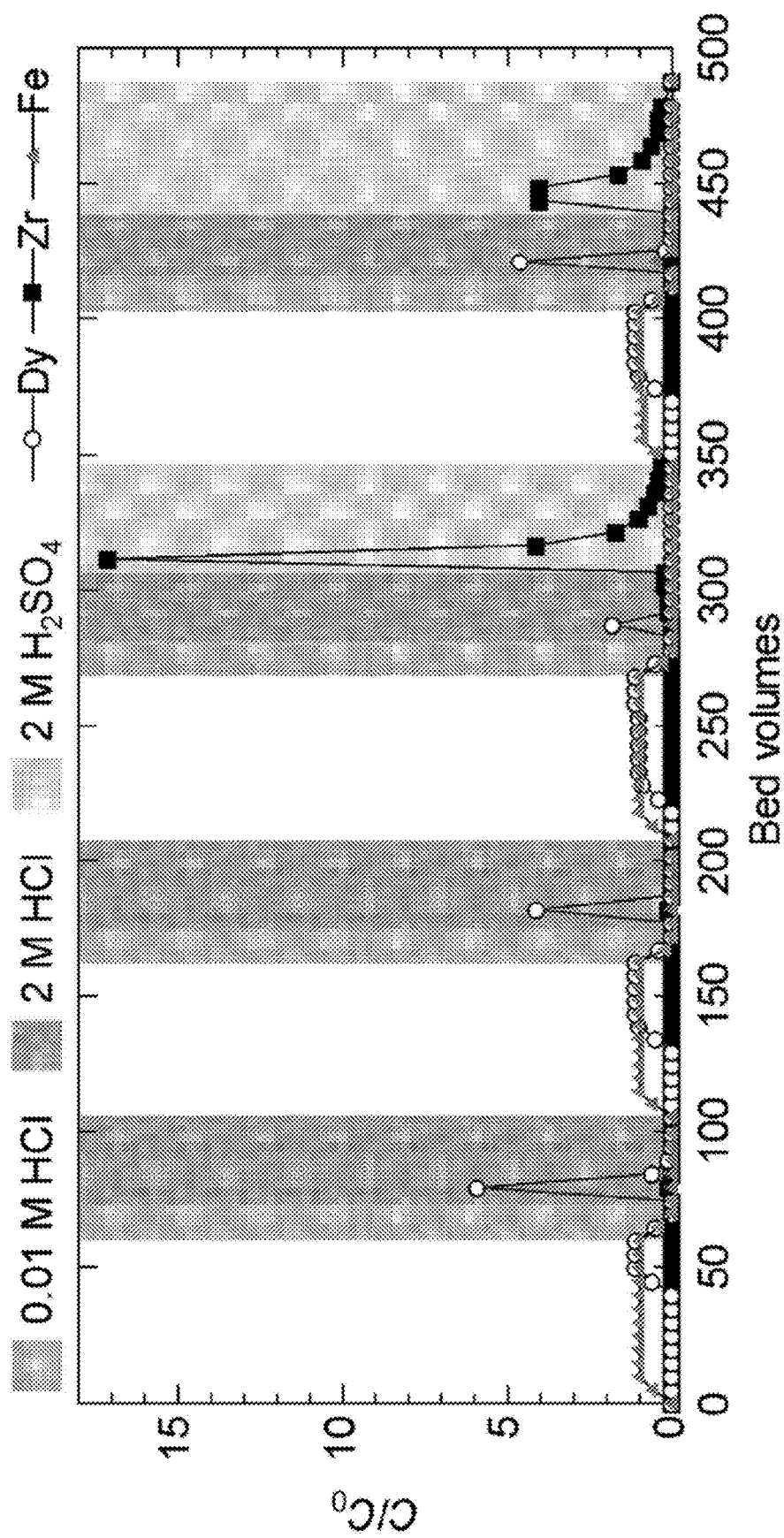
FIG. 5 is a chart showing results of recovery of dysprosium and removal of zirconium using an EDASiDGA packed column.

FIG. 5 shows the change in the concentration of each element in each fraction with respect to the initial concentration $C_0$ of each element. The abscissa Bed volumes in FIG. 5 shows the value obtained by dividing the integrated flow amount of a solution that has passed through a glass column by the column volume. When an adsorbing liquid was passed through the column packed with EDASiDGA, iron as a base metal immediately flowed out without interacting with an adsorbent in the column. On the other hand, dysprosium as a rare earth element and zirconium as a tetravalent ion were retained in the column, and when the flow rate reached a certain level, dysprosium broke through. After the dysprosium breakthrough, when a desorption step was performed with a 2 mol/L hydrochloric acid aqueous solution, the desorbed liquid contained almost no iron as a base metal, and only dysprosium as a rare earth element was able to be recovered. At this time, zirconium, which is a tetravalent ion, was not desorbed and retained in the column. Conditioning was then performed with 0.1 mol/L hydrochloric acid aqueous solution, and the same column test was performed twice with an adsorbing liquid, a washing liquid (0.01 mol/L hydrochloric acid aqueous solution), and a desorbing liquid (2 mol/L hydrochloric acid aqueous solution). As a result, almost the same results were obtained except for the breakthrough time of dysprosium. It was confirmed that the dysprosium breakthrough time tended to decrease with each repetition. Accordingly, the amount of dysprosium that can be recovered by desorption also decreased. This is thought to be directly due to accumulation of zirconium in the column. In a third column test, after a desorption step with 2 mol/L hydrochloric acid aqueous solution, desorption with a 2 mol/L sulfuric acid aqueous solution was performed. As a result, iron and dysprosium were not desorbed, and only zirconium was able to be selectively removed. This sulfuric acid aqueous solution treatment made it clear that the dysprosium adsorption amount was larger in a fourth column test than in a third column test. These results revealed that, by contacting with sulfuric acid, tetravalent ions concentrated in an adsorbent can be removed, and in repeated use of the adsorbent, a decrease in the amount of adsorbed rare earth elements was improved.

INDUSTRIAL APPLICABILITY

A rare earth element can be easily and inexpensively recovered from solutions containing rare earth elements by using the separation method of the present invention, and the rare earth element can be selectively recovered from a dilute aqueous solution simply and inexpensively with high efficiency, and therefore, smelting and recycling industry for rare earth elements can be further developed.

The invention claimed is:

1. A method for separating a rare earth element, comprising
   an adsorption step of bringing a solution containing rare earth element ions and tetravalent ions of a metal element other than the rare earth element ions into contact with an adsorbent to adsorb the rare earth element ions and the tetravalent ions to the adsorbent;
   a rare earth element ion desorption step in which the adsorbent after the adsorption step is brought into contact with a first acidic aqueous solution to desorb the rare earth element ions from the adsorbent; and
   a tetravalent ion desorption step of contacting the adsorbent after the rare earth element ion desorption step with a second acidic aqueous solution to desorb the tetravalent ions from the adsorbent, wherein
   the adsorbent is composed of a substrate and diglycolamic acid introduced into the substrate,
   the first acidic aqueous solution is from 0.1 mol/L to 4 mol/L hydrochloric acid or nitric acid, and
   the second acidic aqueous solution is from 0.5 mol/L to 10 mol/L sulfuric acid.

2. The method for separating a rare earth element according to claim 1, further comprising a rare earth element recovery step of recovering a rare earth element from a solution obtained in the rare earth element ion desorption step.

3. The method for separating a rare earth element according to claim 1,
   comprising at least two rare earth ion desorption steps, wherein
   a tetravalent ion desorption step is performed after at least one rare earth element ion desorption step; and
   at least one rare earth element ion desorption step is performed after the tetravalent ion desorption step.

4. The method for separating a rare earth element according to claim 1, wherein the rare earth element ions are at least one selected from the group consisting of scandium ions, yttrium ions, lanthanum ions, cerium ions, praseodymium ions, neodymium ions, samarium ions, europium ions, gadolinium ions, terbium ions, dysprosium ions, holmium ions, erbium ions, thulium ions, ytterbium ions, and lutetium ions.

5. The method for separating a rare earth element according to claim 1, wherein the tetravalent ions are at least one selected from the group consisting of zirconium ions, thorium ions, and cerium ions.

6. The method for separating a rare earth element according to claim 1, wherein the adsorbent is obtained by introducing the diglycolamic acid into the substrate by an amide bond between a primary amine and/or secondary amine and diglycolic acid or diglycolic anhydride in a carrier including the primary amine and/or secondary amine on the substrate.

7. The method for separating a rare earth element according to claim 6, wherein the carrier is one selected from the group consisting of polyallylamine, polyethyleneimine, and chitosan.

8. The method for separating a rare earth element according to claim 1, wherein the substrate is polystyrene, polyethylene, or polypropylene.

9. The method for separating a rare earth element according to claim 1, wherein the substrate is silica gel.

10. The method for separating a rare earth element according to claim 9, wherein the substrate is silica gel, and the primary amine and/or secondary amine is an alkylamine.

* * * * *

UNITED STATES PATENT AND TRADEMARK OFFICE
CERTIFICATE OF CORRECTION

PATENT NO. : 11,326,228 B2
APPLICATION NO. : 16/754413
DATED : May 10, 2022
INVENTOR(S) : Takeshi Ogata et al.

It is certified that error appears in the above-identified patent and that said Letters Patent is hereby corrected as shown below:

In the Claims

In Claim 10, Column 14, Line 39, "according to claim 9," should read -- according to claim 6, --

Signed and Sealed this
Second Day of August, 2022

Katherine Kelly Vidal
*Director of the United States Patent and Trademark Office*